(12) United States Patent
Rice et al.

(10) Patent No.: US 10,859,667 B2
(45) Date of Patent: Dec. 8, 2020

(54) PROGRAMMABLE REFERENCE BEACONS

(71) Applicant: Hand Held Products, Inc., Fort Mill, SC (US)

(72) Inventors: Mark Rice, Kensington Park (AU); Richard Renner, Cambridge (CA); Andrey Tyagunov, Ottawa (CA)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 729 days.

(21) Appl. No.: 14/993,383

(22) Filed: Jan. 12, 2016

(65) Prior Publication Data
US 2017/0199266 A1    Jul. 13, 2017

(51) Int. Cl.
*G01S 5/02* (2010.01)
*G01S 19/11* (2010.01)
*G01S 5/00* (2006.01)

(52) U.S. Cl.
CPC .......... *G01S 5/0231* (2013.01); *G01S 5/0063* (2013.01); *G01S 5/021* (2013.01); *G01S 19/11* (2013.01)

(58) Field of Classification Search
CPC ...... G01S 5/0231; G01S 5/0063; G01S 5/021; G01S 19/11
See application file for complete search history.

(56) References Cited

U.S. PATENT DOCUMENTS 5,323,163 A * 6/1994 Maki ..................... G01S 19/426
342/357.48
5,917,449 A    6/1999 Sanderford et al.
(Continued)

FOREIGN PATENT DOCUMENTS

CN    102087363 A    6/2011
WO    02078216 A1    10/2002
(Continued)

OTHER PUBLICATIONS

"SAR/Galileo Early Service Demonstration & the MEOLUT Terminal"; Galileo Application Days; Mar. 3-5, 2010; Brussels; Accessed Aug 25, 2018. (Year: 2010).*

(Continued)

*Primary Examiner* — Erin F Heard
*Assistant Examiner* — Donald H B Braswell
(74) *Attorney, Agent, or Firm* — Alston & Bird LLP

(57) ABSTRACT

Search and rescue (SAR) systems utilizing Earth-orbiting satellites are provided. In one implementation, a SAR system comprises a plurality of reference beacons, each having a known geographical location, and a ground-based station. The ground-based station includes one or more antennas for communicating with the reference beacons via a plurality of Earth orbiting satellites. The ground-based station is configured to receive reference signals from each of the reference beacons and calculate estimates of the locations of the reference beacons from the received reference signals. Also, the ground-based station is configured to calculate system calibration factors based on the location estimates and known geographical locations of the reference beacons. The ground-based station is further configured to receive distress signals from at least one distress beacon via the Earth-orbiting satellites and calibrate the distress signals based on the system calibration factors.

21 Claims, 4 Drawing Sheets

(56) References Cited

U.S. PATENT DOCUMENTS

| | | |
|---|---|---|
| 6,832,725 B2 | 12/2004 | Gardiner et al. |
| 7,128,266 B2 | 10/2006 | Marlton et al. |
| 7,159,783 B2 | 1/2007 | Walczyk et al. |
| 7,365,544 B2 | 4/2008 | McCracken et al. |
| 7,413,127 B2 | 8/2008 | Ehrhart et al. |
| 7,726,575 B2 | 6/2010 | Wang et al. |
| 7,787,437 B2 | 8/2010 | Sakoda |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |

(56) References Cited

U.S. PATENT DOCUMENTS

| | | |
|---|---|---|
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van Horn et al. |
| 9,418,252 B2 | 8/2016 | Nahill et al. |
| D766,244 S | 9/2016 | Zhou et al. |
| 9,443,222 B2 | 9/2016 | Singel et al. |
| 9,448,610 B2 | 9/2016 | Davis et al. |
| 9,478,113 B2 | 10/2016 | Xie et al. |
| 9,582,696 B2 | 2/2017 | Barber et al. |
| 9,616,749 B2 | 4/2017 | Chamberlin |
| 9,618,993 B2 | 4/2017 | Murawski et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2007/0063048 A1 | 3/2007 | Havens et al. |
| 2008/0252525 A1 | 10/2008 | Ho et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0046920 A1* | 2/2011 | Amis ............... G01S 19/16 702/181 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0293367 A1* | 11/2012 | Chen ............... G01S 19/04 342/357.68 |
| 2013/0023205 A1* | 1/2013 | Trautenberg ........ G01S 19/17 455/12.1 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0208430 A1* | 8/2013 | Perkins, III ......... H05K 5/0086 361/729 |
| 2013/0257744 A1 | 10/2013 | Daghigh et al. |
| 2013/0257759 A1 | 10/2013 | Daghigh |
| 2013/0265198 A1* | 10/2013 | Stroud ............... G01S 1/04 342/378 |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342393 A1* | 12/2013 | O'Connor ........... G01S 19/28 342/357.25 |
| 2013/0342717 A1 | 12/2013 | Havens et al. |
| 2014/0001267 A1 | 1/2014 | Giordano et al. |
| 2014/0002828 A1 | 1/2014 | Laffargue et al. |

(56) References Cited

U.S. PATENT DOCUMENTS

| | | |
|---|---|---|
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | DiGregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |

(56) References Cited

U.S. PATENT DOCUMENTS

| | | | |
|---|---|---|---|
| 2015/0178536 A1 | 6/2015 | Hennick et al. | |
| 2015/0178537 A1 | 6/2015 | El et al. | |
| 2015/0181093 A1 | 6/2015 | Zhu et al. | |
| 2015/0181109 A1 | 6/2015 | Gillet et al. | |
| 2015/0186703 A1 | 7/2015 | Chen et al. | |
| 2015/0193644 A1 | 7/2015 | Kearney et al. | |
| 2015/0193645 A1 | 7/2015 | Colavito et al. | |
| 2015/0199957 A1 | 7/2015 | Funyak et al. | |
| 2015/0204671 A1 | 7/2015 | Showering | |
| 2015/0210199 A1 | 7/2015 | Payne | |
| 2015/0220753 A1 | 8/2015 | Zhu et al. | |
| 2015/0254485 A1 | 9/2015 | Feng et al. | |
| 2015/0327012 A1 | 11/2015 | Bian et al. | |
| 2016/0003933 A1 | 1/2016 | Calmettes et al. | |
| 2016/0014251 A1 | 1/2016 | Hejl | |
| 2016/0040982 A1 | 2/2016 | Li et al. | |
| 2016/0042241 A1 | 2/2016 | Todeschini | |
| 2016/0054425 A1* | 2/2016 | Katz | G01S 3/14 342/417 |
| 2016/0057230 A1 | 2/2016 | Todeschini et al. | |
| 2016/0109219 A1 | 4/2016 | Ackley et al. | |
| 2016/0109220 A1 | 4/2016 | Laffargue | |
| 2016/0109224 A1 | 4/2016 | Thuries et al. | |
| 2016/0112631 A1 | 4/2016 | Ackley et al. | |
| 2016/0112643 A1 | 4/2016 | Laffargue et al. | |
| 2016/0124516 A1 | 5/2016 | Schoon et al. | |
| 2016/0125217 A1 | 5/2016 | Todeschini | |
| 2016/0125342 A1 | 5/2016 | Miller et al. | |
| 2016/0133253 A1 | 5/2016 | Braho et al. | |
| 2016/0171720 A1 | 6/2016 | Todeschini | |
| 2016/0178479 A1 | 6/2016 | Goldsmith | |
| 2016/0180678 A1 | 6/2016 | Ackley et al. | |
| 2016/0189087 A1 | 6/2016 | Morton et al. | |
| 2016/0125873 A1 | 7/2016 | Braho et al. | |
| 2016/0227912 A1 | 8/2016 | Oberpriller et al. | |
| 2016/0232891 A1 | 8/2016 | Pecorari | |
| 2016/0292477 A1 | 10/2016 | Bidwell | |
| 2016/0294779 A1 | 10/2016 | Yeakley et al. | |
| 2016/0306769 A1 | 10/2016 | Kohtz et al. | |
| 2016/0314276 A1 | 10/2016 | Sewell et al. | |
| 2016/0314294 A1 | 10/2016 | Kubler et al. | |
| 2017/0001699 A1* | 1/2017 | Macikunas | G08G 3/00 |

FOREIGN PATENT DOCUMENTS

| | | | |
|---|---|---|---|
| WO | 2013163789 A1 | 11/2013 | |
| WO | 2013173985 A1 | 11/2013 | |
| WO | 2014019130 A1 | 2/2014 | |
| WO | 2014110495 A1 | 7/2014 | |

OTHER PUBLICATIONS

U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
Search Report in related European Application No. 16206024.8 dated Jun. 9, 2017, pp. 1-9.
Gregoire et al., "MEOSAR New GNSS Role in Search and Rescue", Dec. 1, 2014, www.insidegnss.com/auto/novdec14-WP_0.pdf, pp. 57-69 [cited in EP Search Report].
Communication Under Rule 71(3), for European Application No. 16206024.9, dated Nov. 14, 2018, 5 pages.
Decision to Grant, for European Application No. 16206024.9, dated Nov. Mar. 7, 2019, 2 pages.
U.S. Patent Application for a Laser Scanning Module Employing an Elastomeric U-Hinge Based Laser Scanning Assembly, filed Feb. 7, 2012 (Feng et al.), U.S. Appl. No. 13/367,978.
U.S. Patent Application for Indicia Reader filed Apr. 1, 2015 (Huck), U.S. Appl. No. 14/676,109.

* cited by examiner

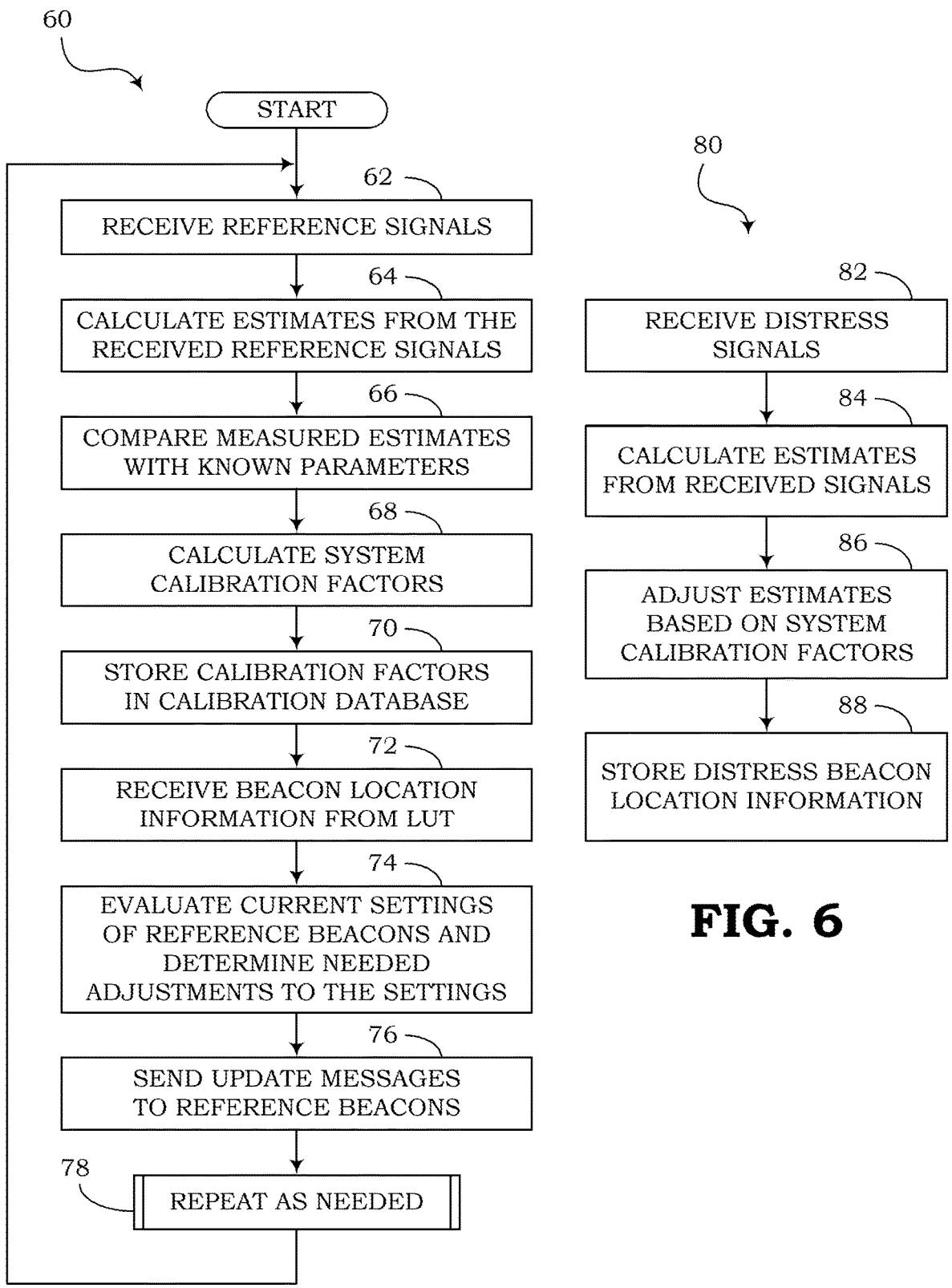

PROGRAMMABLE REFERENCE BEACONS

FIELD OF THE INVENTION

The present invention relates to search and rescue (SAR) systems and more particularly relates to programmable reference beacons for use in SAR systems.

BACKGROUND

Generally speaking, search and rescue (SAR) operations are often initiated in response to a distress signal from a distress beacon. In the event of an emergency, a distress beacon can be activated manually by a user. Alternatively, some distress beacons are designed to be activated automatically, such as for situations when an aquatic vessel takes on a certain amount of water or when an airplane experiences abnormal forces.

Search and rescue (SAR) agencies often rely on information from the COSPAS-SARSAT system. The name COSPAS-SARSAT is an acronym formed by a combination of the Russian and English words Cosmicheskaya Sisteyama Poiska Avariynich Sudov—Search and Rescue Satellite-Aided Tracking. The COSPAS-SARSAT system operates through a cooperative international program supported by its member states and has been instrumental in saving tens of thousands of lives since its inception in the 1970s.

With the COSPAS-SARSAT system, Earth-orbiting satellites are used to receive distress signals and forward the signals to ground stations. To determine a location that includes latitude and longitude coordinates, a minimum of three satellites are needed. To determine latitude, longitude, and altitude, four satellites are needed.

Various types of distress beacons may include emergency position indicating radio beacons (EPIRB) such as those used on boats and other watercraft, emergency locating transmitters (ELT) such as those for use on airplanes, and personal locator beacons (PLB) for use by hikers. The distress beacons deployed globally today are limited to sending a simple distress alert signal. A new class of beacons is being developed known as second-generation distress beacons, which will include the additional capability of receiving a confirmation response indicating that a distress signal was indeed received and that help is being deployed.

The distress beacon transmits a radio signal burst having a frequency of 406 MHz in the UHF band. The radio signal burst is received by Earth-orbiting satellites. In addition, reference beacons may be positioned at various known locations on Earth. The reference beacons are configured to transmit reference signals from the known locations to the satellites. Measurements of frequency and time obtained from the reference signals can be calibrated for inaccuracies and unknowns in the system.

Currently, satellites used in the COSPAS-SARSAT system may be in the orbital ranges including low Earth-orbit (LEO) of about 1,000 kilometers above Earth's surface, medium Earth-orbit (MEO) of about 19,000 to 24,000 kilometers above the surface, and geostationary orbit (GEO) of about 36,000 kilometers above the surface. The second-generation system will primarily use medium Earth-orbit search-and-rescue (MEOSAR) satellites. The radio signals received by the satellites are then relayed to a receiving station, such as a local user terminal (LUT), which is located on the ground.

The LUTs may include any suitable types of antennas for receiving the emergency beacon messages relayed by a plurality of satellites. Under typical conditions, multiple satellite signals are obtained at the LUT, each signal arriving via a different path. The frequency and time of arrival at the LUT is estimated for each signal. The LUT processes the signals to determine the location estimation of the beacon and then passes a message to one of the mission control centers (MCCs) around the world, where the message is validated and distributed to rescue coordination centers. Then, the closest appropriate emergency responders are selected and tasked with the rescue mission.

In the current system, reference beacons transmit at regular time intervals with a known, unique signal signature that can be differentiated from the normal distress beacon signals. There are limitations in the number of reference beacons available in various regions of the Earth. There are also limitations in the locations of reference beacons, the accuracy of the reference signal parameter estimates, and the maximum level of radio interference tolerable for the system.

Currently, there are no commercially-available low-cost reference beacons that can be widely deployed across remote locations. Therefore, a need exists for such reference beacons that can be used with the second-generation SAR system. In addition, a need exists for programmable reference beacons that can be widely dispersed across the globe for more accurate location monitoring.

SUMMARY

Accordingly, in one aspect, the present invention embraces search and rescue (SAR) systems, which may include, among other things, distress beacons, reference beacons, and Earth-orbit satellites. In one implementation, a search and rescue (SAR) system comprises a plurality of reference beacons, each reference beacon having a known geographical location, and a ground-based station. The ground-based station has one or more antennas for communicating with the plurality of reference beacons via a plurality of Earth-orbiting satellites. The ground-based station is configured to receive reference signals from each of the reference beacons and calculate estimates of the locations of the reference beacons from the received reference signals. The ground-based station is further configured to receive location information related to the known geographical locations of the reference beacons and calculate system calibration factors based on the location estimates and the location information. Furthermore, the ground-based station is further configured to receive distress signals from at least one distress beacon via the Earth-orbiting satellites and calibrate the distress signals based on the system calibration factors.

In an exemplary embodiment, a reference beacon may comprise an ultra-high frequency (UHF) antenna configured to transmit reference signals to a ground-based station via a plurality of Earth-orbiting satellites. Also, the reference beacon may include a reference signal generator having a plurality of adjustable configuration settings. The reference signal generator may be configured to generate the reference signals according to the configuration settings. In this embodiment, the reference beacon also includes a second antenna configured to receive update messages, which may be received from the ground-based station via the Earth-orbiting satellites. A reference beacon controller is configured to adjust the configuration settings of the reference signal generator based on the update messages.

In another exemplary embodiment, a method of calibrating a search and rescue system is provided. The method includes the step of calculating system calibration factors based on location estimates of at least one reference beacon and known location information of the at least one reference beacon. The method also includes evaluating reference settings of the at least one reference beacon in light of operational conditions of the at least one reference beacon. An update message is then sent to the at least one reference beacon to adjust the reference settings.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 5 schematically depicts a flow diagram of a method for calculating calibration factors of the SAR system of FIG. 1 according to an embodiment of the present invention.

FIG. 6 schematically depicts a flow diagram of a method for processing distress signals according to an embodiment of the present invention.

DETAILED DESCRIPTION

The present invention embraces search and rescue (SAR) systems, particularly those using Earth-orbiting satellites. Because of various environmental conditions, terrain, transmission channels, total electron content (TEC) in the ionosphere, weather, background radio noise, and other signal path effects, it is useful to calibrate for inaccuracies and unknowns in the system. Some signal path effects that affect the accuracy of beacon position measurements may include errors in satellite ephemeris, satellite translation frequency, satellite transponder group delay variations, radio propagation delay variations in the ionosphere and troposphere, and other periodic or random factors. Also, second generation beacons (SGBs) operating with first generation beacons may cause mutual interference and increase the noise floor in the frequency band near 406 MHz. In some cases, the beacons may be designed to operate with non-standard waveforms designed to facilitate detection and localization by suitably equipped ground stations.

Second generation SAR systems may be capable of reducing the beacon locating process time from about 45 minutes down to as little as about a minute. For example, the second-generation system is intended to include 72 medium Earth orbiting search and rescue (MEOSAR) satellites. Thus, multiple satellites will be able to pick up every emergency beacon signal from any location on Earth.

Also, second generation beacons can provide finer time resolution than the current system. However, this resolution can only be fully exploited if system calibration is sufficiently accurate. Therefore, the present disclosure provides embodiments of programmable reference beacons and the calculation of system calibration parameters for adjusting location estimates of the reference beacons, wherein the system calibration parameters can then be used to adjust location estimates of distress beacons in an emergency situation.

According to the embodiments of the present invention, many programmable reference beacons may be remotely deployed at multiple locations on or near the surface of the Earth. These programmable reference beacons can be monitored and controlled from one or more coordination centers in a manual or automated manner.

Figure 1:
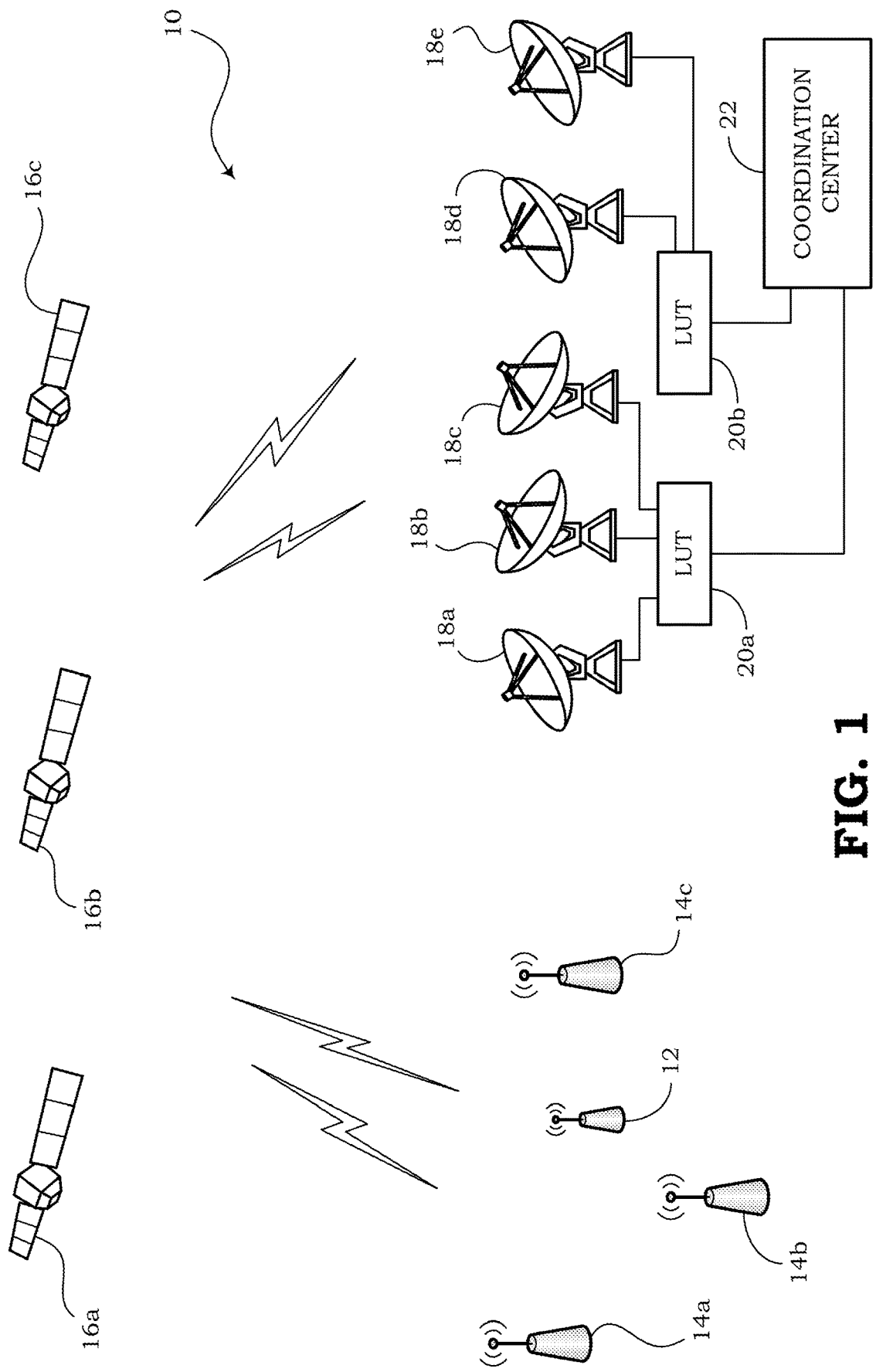
FIG. 1 schematically depicts a diagram of a search and rescue (SAR) system according to an embodiment of the present invention.

FIG. 1 is a diagram illustrating an embodiment of a search and rescue (SAR) system 10. The SAR system 10 includes a distress beacon 12, a plurality of reference beacons 14, a plurality of satellites 16, a plurality of antennas 18, a plurality of local user terminals (LUTs) 20, and a coordination center 22. It should be noted that there may be any number of distress beacons 12 representing any number of users, but only one is shown in FIG. 1 for the sake of simplicity. Also, there may be any number of reference beacons 14, satellites 16, antennas 18, LUTs 20, and coordination centers 22 in the SAR system 10.

The distress beacon 12 can be activated in the event of an emergency situation. The SAR system 10 receives the distress signals and processes the signals to determine a location of the distress beacon. In some embodiments, the distress beacon 12 may be mounted on a maritime vessel (e.g. boat), aircraft, or other vessel or vehicle. The distress beacons 12 on these vessels may be configured to activate automatically when an emergency arises.

In other embodiments, the distress beacons 12 may be carried by hikers, explorers, or other people who may be removed from civilization. Therefore, the distress beacons 12 are intended to be carried with the user and provide information regarding the location of the user when activated. These portable distress beacons 12 are typically activated manually by the user in the event of an emergency.

The reference beacons 14 of the present invention are programmable beacons that can be programmed and reprogrammed in the field. The reference beacons 14 may be permanently positioned at any locations over the surface of the Earth. Because of the autonomy of the reference beacons 14, as described in more detail below, deployment of the reference beacons 14 may include disbursing the devices apart from each other to provide multiple references points, particularly in areas where rescue may more likely be needed. The location of the reference beacons 14 does not necessarily need to be at or near the LUTs 20.

In some embodiments, the reference beacons 14 may be attached to a moveable object, such as an airplane, boat, buoy, balloon, or other vehicles or objects. The location of the mobile reference beacons can be accurately tracked by the SAR system 10 and reported to a LUT 20 and/or coordination center 22.

During an initial calibration stage, each reference beacon 14 transmits reference signals, which are relayed from multiple satellites 16 to the antennas 18. The LUTs 20 and coordination center 22 process the reference signals to determine an estimate of the locations of the reference beacons 14. The estimates may be based on frequency and time parameters obtained from signals transmitted along different paths between known positions of the reference beacons 14, satellites 16, and antennas 18. For instance, the reference beacons 14 may be equipped with global positioning system (GPS) equipment for obtaining the known location of the reference beacons 14. By comparing the known locations with the estimated locations, the ground-based stations are able to calculate system calibration factors that can be used to adjust the estimates for more precise positioning analysis.

Also, certain adjustments to the reference beacons can be made by transmitting update messages to the reference beacons. In this way, the reference beacons can be optimized to allow location parameters to be accurately estimated. Update messages can be sent to an individual reference beacon to program or reprogram just the one reference beacon. Also, update messages may be sent to a group of reference beacons to program or reprogram all the reference beacons in the group.

The programming or reprogramming of the reference beacons can be performed remotely to optimize the effectiveness of the reference beacons. For example, optimization may include instructing the reference beacons to transmit the reference signals so as to minimize interference with distress signals. The reference beacons can be optimized with respect to the time and frequency of transmission, the signal strength, and other characteristics of the signals.

After the initial calibration and reference programming stages, the SAR system 10 is ready to accurately estimate the location of actual distress signals. Thus, when the distress beacon 12 is activated in an emergency situation when a user is in danger and requires rescuing, the SAR system 10 can determine the location of the user more accurately than conventional systems.

In operation, when the distress beacon 12 is activated, it is configured to transmit a burst of signals at or near the frequency of 406.05 MHz. At any particular time, several of the satellites 16 (e.g., satellites 16a, 16b, 16c, etc.) will be positioned with respect to the Earth's surface to be able to receive signals from the distress beacon 12. These satellites 16 receive the signals from the distress beacon 12 and relay these signals to a number of ground-based antennas 18 (e.g., antennas 18a, 18b, 18c, 18d, 18e, etc.).

Each LUT 20 may be configured to handle the operation of any number of antennas 18. Typically, each LUT 20 may include about four to eight antennas 18. A number of LUTs 20 (e.g., LUTs 20a, 20b, etc.) may be configured to process the distress signals relayed by the satellites 16. The LUTs 20 may utilize various processing steps to calculate the position of the distress beacon 12 using frequency, frequency shift, time of arrival of the signals, and other factors.

Normally, the estimation of the location of the distress signal ends at this point. However, according to some embodiments of the present invention, the estimates can be adjusted based on the previously calculated system calibration factors. The information is then communicated via wired or wireless transmission to a coordination center 22. When the distress signal is verified, the coordination center 22 is responsible for deploying SAR agencies available near the location of the distress beacon 12 to provide appropriate rescue actions.

It should be known that the beacon locating process may be affected by various signal path effects, which cause inaccuracies in the calculations. Therefore, according to the teachings of the present disclosure, the SAR system 10 is able to make adjustments by calibrating the components of the system and also provide updates to the reference beacons 14, even when they are already deployed and in use. Also, the information determined to make such adjustments or calibrations can be used to adjust the beacon location information to fine-tune the estimates.

Figure 2:
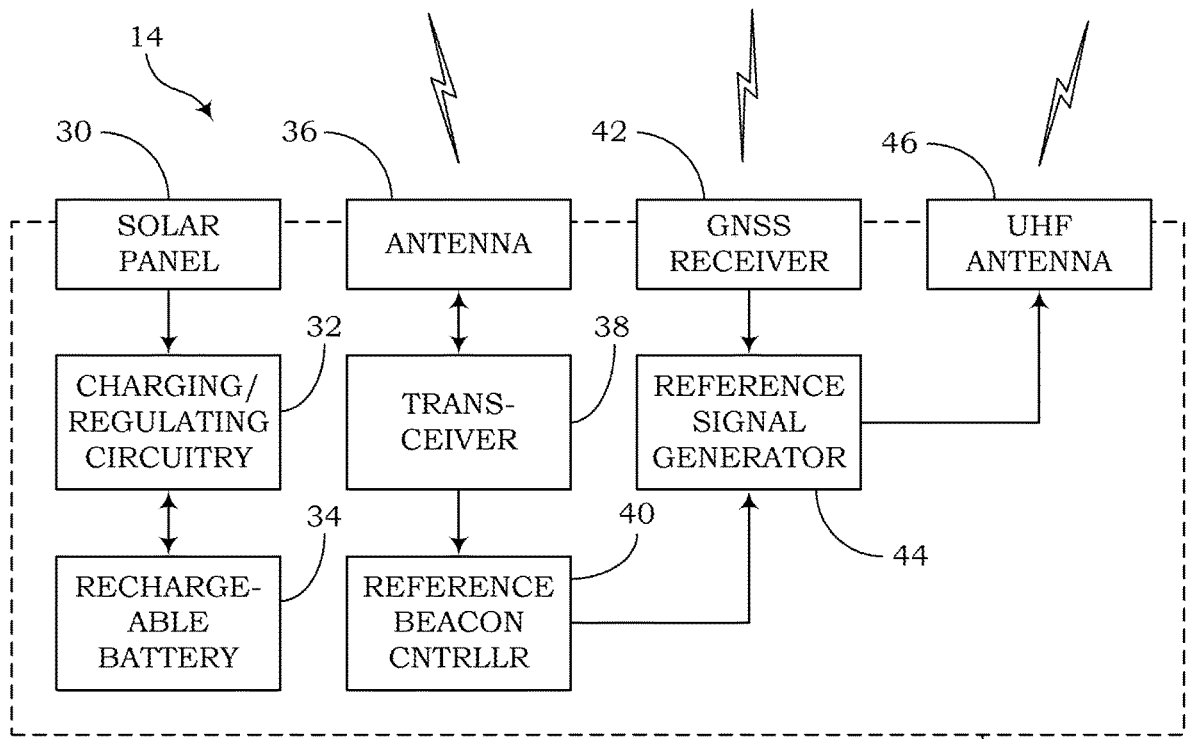
FIG. 2 schematically depicts a block diagram of one of the reference beacons shown in FIG. 1 according to an embodiment of the present invention.

FIG. 2 is a block diagram illustrating an embodiment of one of the programmable reference beacons 14 shown in FIG. 1. In this embodiment, the reference beacon 14 includes a housing 28, a solar panel 30, charging/regulating circuitry 32, a rechargeable battery 34, an antenna 36, a transceiver 38, a reference beacon controller 40, a global navigation satellite system (GNSS) receiver 42, a reference signal generator 44, and a UHF antenna 46. As shown, the components including the solar panel 30, antenna 36, GNSS receiver 42, and UHF antenna 46 may be mounted at least partially outside of the housing 28, whereas the other components of the reference beacon 14 are disposed inside the housing 28. The housing 28 may be configured to be rugged, adequately sealed to protect the internal components, and weather proof.

The solar panel 30 may include one or more photovoltaic cells for capturing energy from the sun. The charging/regulating circuitry 32 uses the solar power to charge the rechargeable battery 34. When the rechargeable battery 34 is sufficiently charged, the charging/regulating circuitry 32 receives power from the rechargeable battery 34 and provides regulated power to each of the components of the reference beacon 14 as needed.

The antenna 36 and transceiver 38 are configured to enable an antenna communication link with one or more of the antennas 18 via satellites 16. The transceiver 38 may be configured to receive messages regarding the operation of performing modifications to the reference beacon 14 in the field. The messages may contain information for programming, reprogramming, configuring, reconfiguring, updating, and/or upgrading the reference beacon 14 to enable the reference beacon 14 to function optimally within the system. In this example, the messages may be communicated in order to adjust reference settings or configuration settings of the reference beacon 14.

The GNSS receiver 42 is configured to receive signals from global positioning system (GPS) satellites or other navigation systems. The signals can be used to determine a fixed location of the reference beacon 14 or to track the location if the reference beacon 14 is configured to be moved. The GNSS signals further include timing reference information and clock signal reference information, which can be used for synchronizing with a universal time.

The reference beacon controller 40 sends configuration settings to the reference signal generator 44. The reference signal generator 44 also receives location information, satellite ephemeris, timing reference information, and clock reference information from the GNSS receiver 42. From this information, the reference signal generator 44 is able to generate an optimized RF signal to the UHF antenna for communication of the reference signal to the satellites 16.

The reference beacon controller 40 may also be configured to control the transmissions based on variable environmental and/or operational conditions. For example, the reference beacon 14 can determine the "visibility" of satellites by analyzing signals obtained by the GNSS receiver 42. Based on these and other environmental and/or operational conditions, the reference beacon controller 40 can control the reference signal generator 44 and UHF antenna 46 to transmit signals accordingly. A non-exhaustive list of examples of factors that may alter the environmental and/or operational conditions includes weather, total electron content (TEC), terrain, and radio noise, just to name a few.

Figure 3:
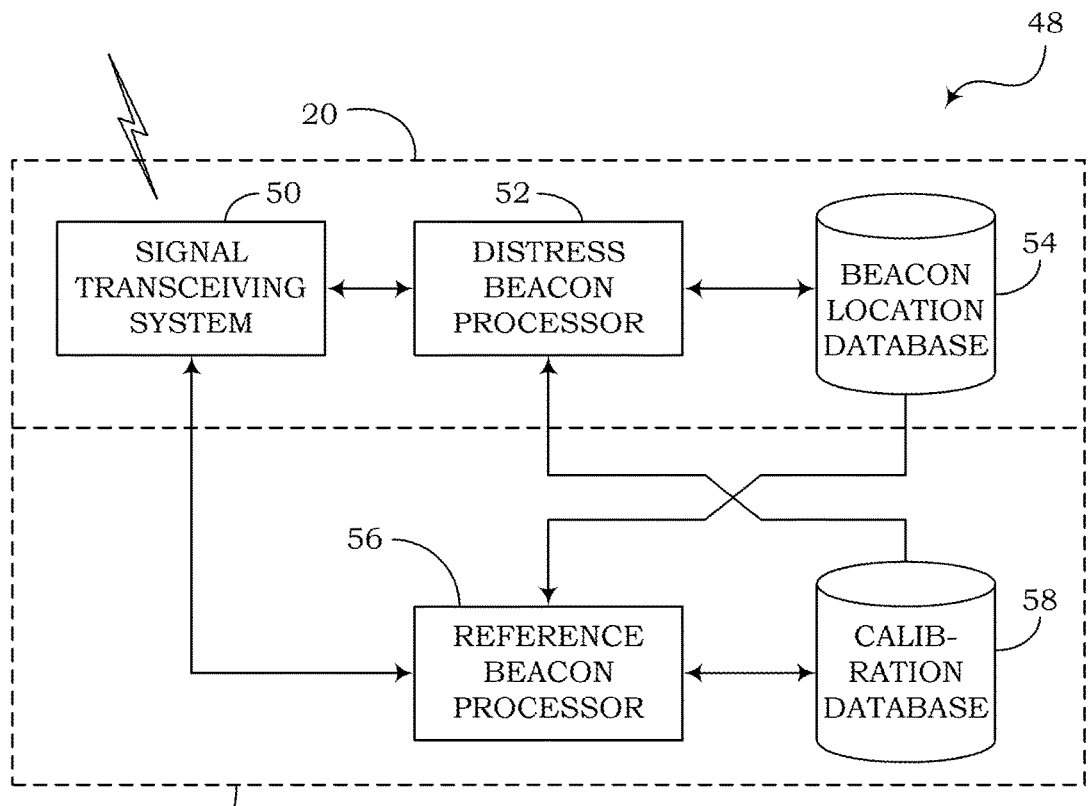
FIG. 3 schematically depicts a block diagram of a beacon processing station according to an embodiment of the present invention.

FIG. 3 is a block diagram of an embodiment of a beacon processing station 48 or ground-based station. The beacon processing station 48 in this embodiment includes one of the LUTs 20 (e.g., LUT 20a) shown in FIG. 1 and the coordination centers 22. The LUT 20 and coordination center 22, as shown in FIG. 3, may be housed together in one facility. The LUT 20 of the beacon processing station 48 includes, among other things, a signal transceiving system 50, a distress beacon processor 52, and a beacon location database 54. The coordination center 22 of the beacon processing station 48 includes, among other things, a reference beacon processor 56 and a calibration database 58.

The distress beacon processor 52 is configured to perform processing operations with respect to handling one or more distress signal calls. The reference beacon processor 56 is configured to perform processing operations with respect to handling reference signals and adjusting the calculation of the distress signal location estimates based on how the reference signals were handled.

The signal transceiving system 50 is configured to receive both distress signals and reference signals via the satellites 16. The distress signals are forwarded to the distress beacon processor 52 and the reference signals are forwarded to the reference beacon processor 56. In response to receiving a distress signal, the distress beacon processor 52 may be configured to enable the signal transceiving system 50 to transmit a signal back to the distress beacon 12 via the antenna 18 and satellite 16 to indicate to the user in distress that help is on the way.

The distress beacon processor 52 is also configured to determine an initial location estimate of the distress beacon 12 from the distress signal. The beacon location information is stored in the beacon location database 54. Also, the distress beacon processor 52 can make various adjustments to its calculations based on calibration information stored in the calibration database 58, as described below.

The reference beacon processor 56 is configured to analyze the reference beacon signals and compare the results with calibration information previously stored. The previously stored information may include known reference beacon location information. The reference beacon processor 56 also receives the distress beacon location information from the beacon location database 54 and recalibrates the location information based on the comparison of the previously known reference beacon information and the presently calculated reference beacon information. It can be implied that the discrepancies that caused the alterations in the reference beacon information also affect the distress signals. Therefore, the adjustments to the reference beacon information, such as those made during the initial calibration stage as mentioned above, can be applied to the distress beacon information to obtain a calibrated or more finely-tuned calculation of the distress beacon location.

Adjustments can be made due to various signal path effects experienced by the transmitted distress signals and reference signals. Because of inaccuracies in the system due to the various signal path effects, the reference beacon processor 56 is able to determine calibration information. This calibration information is stored in the calibration database 58.

Figure 4A:
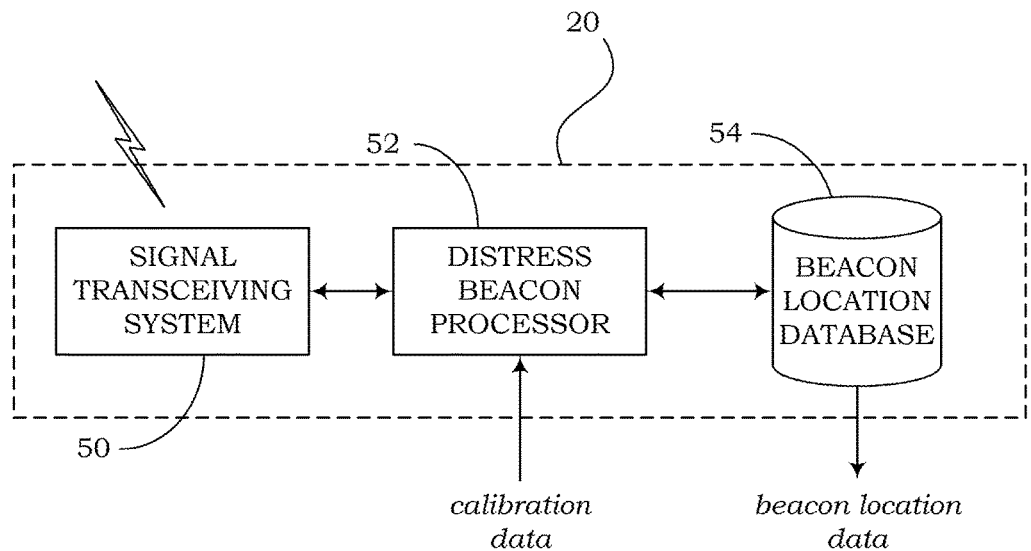
FIG. 4A schematically depicts a block diagram of one of the local user terminals (LUTs) shown in FIG. 1 according to an embodiment of the present invention.
Figure 4B:
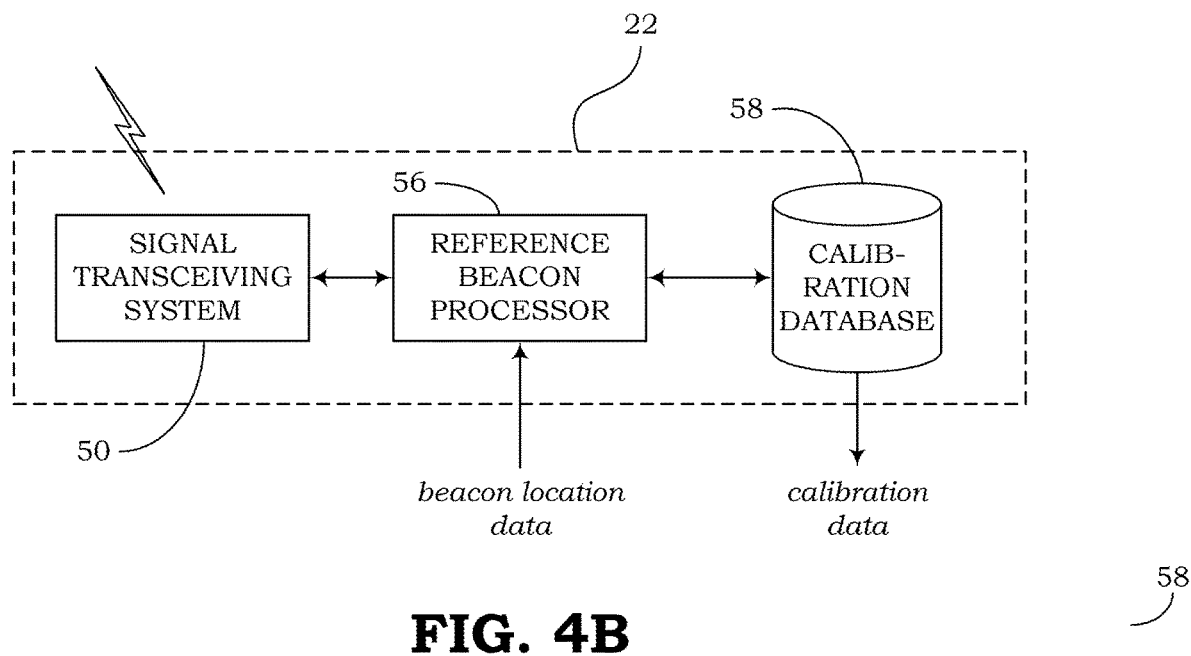
FIG. 4B schematically depicts a block diagram of the coordination center shown in FIG. 1 according to an embodiment of the present invention.

FIG. 4A is a block diagram illustrating an embodiment of one of the LUTs 20 shown in FIG. 1. FIG. 4B is a block diagram illustrating an embodiment of the coordination center shown in FIG. 1. As opposed to the beacon processing station 48 of FIG. 3, the embodiments of FIGS. 4A and 4B are provided when the LUT 20 is situated remotely from the coordination center 22. The operations of the various components of the LUT 20 and coordination center 22 are substantially the same as those described with respect to FIG. 3 and therefore will not be repeated for the sake of brevity.

However, instead of a direct connection between the distress beacon processor 52 of the LUT 20 and the calibration database 58 of the coordination center 22, the calibration information can be communicated to the LUT 20 in another manner. For example, the LUT 20 and coordination center 22 may communicate using wired transmission via a wide area network (e.g., the Internet), using wireless technology (e.g., cellular transmission or other radio transmission), etc. Likewise, the beacon location information stored in the beacon location database 54 of the LUT 20 can be communicated to the reference beacon processor 56 of the coordination center 22 via various wired or wireless protocols.

With respect to the embodiments of FIGS. 4A and 4B, the signal transceiving systems 50 in each of the LUT 20 and coordination center 22 may be configured to receive different types of signals. The satellite downlink for the signal transceiving system 50 of the LUT 20 may be configured to include only distress beacon signals, whereas the signal transceiving system 50 of the coordination center 22 may be configured to include only reference beacon signals for calibration purposes. Also, the calibration database 58 shown in FIG. 4B may include calibration information from multiple sites and may be shared with multiple LUTs 20.

FIG. 5 is a flow diagram illustrating a method 60 that may be performed by the coordination center 22 shown in FIG. 1. In some embodiments, the method 60 may be an initial calibration stage performed before distress signals are received. In some examples, the steps of the method 60 may be configured in software, firmware, and/or hardware for enabling a processor (e.g., the reference beacon processor 56 shown in FIGS. 3 and 4B) to execute the various functions.

As indicated in block 62, the step of receiving reference signals from one or more reference beacons is performed. The reference signals may include transmission parameters, such as time of transmission, frequency of transmission, signal strength, etc. The reference signals may also include information regarding the known location of the reference beacon, which may be obtained using GPS coordinates.

As indicated in block 64, the method 60 includes calculating estimates of the location of the reference beacons from the received reference signals. The estimates may be calculated by analyzing the time and frequency characteristics of the signals that reach the antennas 18 by different signal paths (e.g., via different satellites 16). Block 66 indicates that the estimated location measurements are compared with known location parameters (e.g., GPS coordinates).

The method 60 further includes the step, indicated in block 68, for calculating system calibration factors. The system calibration factors may be calculated based on known beacon location information, timing characteristics, transmission speeds, triangulation calculations, interpolation calculations, and other factors. The calibration factors are then stored in a calibration database according to block 70.

The method 60 also includes receiving beacon location data from the LUT, as indicated in block 72, which allows the reference beacon signals to be adjusted accordingly. From the calibration factors and beacon location data, the method 60 further includes the step of evaluating the current reference settings of the reference beacons, according to block 74, to determine inaccuracies or discrepancies in the calculations. From the discrepancies, adjustments to the reference settings can be made as needed. The proper adjustments to the reference settings are made to reconcile any inaccuracies.

When the reference settings are adjusted, update messages are sent to the reference beacons as indicated in block 76. The update message may include information for enabling the reference beacons to make modification to its reference settings. The step of adjusting the reference settings can be performed by the reference beacons even when positioned remotely from the other SAR system components. Adjusting the settings optimizes the operability of the reference beacons within the system.

FIG. 6 is a flow diagram illustrating an embodiment of a method 80 of operation for processing distress signals. As indicated in block 82, the method 80 includes receiving a distress signal from a distress beacon. From the received distress signal, estimates of the location of the distress beacon are calculated. Block 86 indicates that adjustments are made to the location estimates based on the system calibration factors stored during the initial calibration stage. The distress beacon location information is then stored in a database, as indicated in block 88.

According to the various embodiments described in the present disclosure, reference beacons can be distributed in any location, even areas that are remote from other ground structures such as the antennas 18, LUTs 20, and coordination center 22. This arrangement enables generation of a dynamic distribution of reference signals in time, space, and waveform structure. Therefore, the calibration needs of the SAR system 10 can be met with minimal impact on beacon signal detection.

With such a distribution across a wide area, the variation in calibration factors between reference points can more accurately be adjusted using interpolation. For example, the reference beacons 14 may be activated with a pattern that minimizes the interference effect on the SAR system 10 while also providing good system calibration. Rather than simple periodic transmissions in a fixed periodic pattern as is done with conventional reference beacons, a more complex pseudo random pattern can be used by the reference beacons 14 of the present disclosure, which can limit the number of transmissions within a given area.

The signal pattern may include many parameters such as burst duration, inter burst duration, transmit power level and signal format including modulation, coding and pulse shaping. The reference beacons 14 are activated with patterns that may be adapted in response to the needs of the system for management of accuracy and interference within a given location or region. Intelligent patterns for activation can be selected and remotely managed by the coordination center 22.

The reference beacons 14 can be manufactured as a low cost, low maintenance device with remote monitoring and control. Thus, it may be feasible to install many units across wide geographical areas to maximize coverage. Programmability allows the SAR system 10 to be readily adapted for optimization or even cater to future scenarios.

The reference beacon 14 of FIG. 2 may be implemented in a software-defined radio (SDR). For example, in recent work, Honeywell funded development of a programmable test beacon using the Ettus/National Instruments Universal Soft Radio Platform (USRP). This has been programmed to transmit either first or second generation signals in the UHF 406 MHz band. Other waveforms may be programmed onto this radio. Accurate clocking and timing for the USRP may be obtained using a GPS receiver, generating 1 sec pulses for timestamp and a 10 MHz clock. HGT has demonstrated clock accuracy of better than 50 nanoseconds when transmitting and receiving with two USRPs locked to separate GPS derived reference clocks.

An alternative highly stable time reference for special applications is the Chip Scale Atomic Clock (CSAC). Honeywell has developed CSAC technology suitable for miniature, portable, battery powered units with the lowest grade of accuracy better than 1 part in $10^{10}$, noting that 1 in $10^{11}$ is needed for good Frequency of Arrival calibration.

The reference beacon 14 can be activated and dynamically reprogrammed remotely using an IP connection if available. In other cases, a separate radio can be used to control and monitor the beacon. For example, in remote locations, this could be a satellite Machine-to-Machine (M2M), such as HGT's SAT-401, the IDP-680, an Inmarsat BGAN terminal, or other suitable M2M. The SAT-401 is a very low cost SDR, designed for long life in an exposed outdoor environment.

Furthermore, the satellite radio could be implemented in software on the USRP. When instructed, the radio could be reconfigured to transmit the required reference signal pattern. A dual mode radio would require two antennas, one for UHF and a second for the satellite messaging protocol, typically a patch or helical design, depending on the network requirements. Alternatively, it may be feasible to use a single antenna for a UHF satcom link. Ideally, a 406 MHz antenna with a hemispherical pattern (i.e. patch or helix) may be preferred rather than a monopole or dipole.

According to additional embodiments, the calibration operations described in the present disclosure may be further improved by tracking measurement bias against historical data. Also, estimation of measurement error variance may be improved to assist with search planning.

Some embodiments may also include configuring the reference beacons with an omnidirectional antenna to enable evenly distributed communication channels across the sky. Omnidirectional antennas may be less expensive than directional antennas. With omnidirectional antennas, circuitry may be added to account for satellite uplink signals, which may be affected by multipath fading that causes signal loss.

Alternatively, a directional antenna enables the reference beacon to be directed to a particular satellite to avoid the fading effect. In some embodiments, the directional antenna could be pointed at one or more satellites as directed. Instructions regarding a satellite to which the antenna is to be directed may be included in the update messages from the LUT, as discussed above. Also, one or both types of antennas could be incorporated in the reference beacons to provide more reliable satellite communication.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;

U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;

U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;

U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILEPHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A search and rescue (SAR) system comprising:
a ground-based station that comprises an antenna configured to communicate with a reference beacon via a satellite, wherein the ground-based station is configured to:
receive a reference signal from the reference beacon;
calculate an estimate of a location of the reference beacon based on at least one of a frequency and a timing information associated with the received reference signal;
receive known geographical location information captured by a global positioning system (GPS) associated with the reference beacon;
calculate a system calibration factor used for adjusting the estimate of the location of the reference beacon, based on comparison of the calculated estimate of the location of the reference beacon and the received known geographical location information of the reference beacon;
receive, via the satellite, a distress signal from a distress beacon which is different than the reference beacon; and
calibrate the distress signal based on the calculated system calibration factor,
wherein the ground-based station is further configured to send an update message to the reference beacon, wherein the update message comprises information enabling the reference beacon to adjust a transmission characteristic to minimize interference between the reference signal and the distress signal with respect to time and frequency.

2. The SAR system of claim 1, wherein the ground-based station comprises a local user terminal (LUT) in communication with a coordination center.

3. The SAR system of claim 2, wherein the LUT and coordination center are located at a single facility.

4. The SAR system of claim 1, wherein the ground-based station is further configured to determine a location of the distress beacon by calibrating information in the distress signal based on the system calibration factor.

5. The SAR system of claim 4, wherein the distress beacon and reference beacon are second-generation beacons (SGBs).

6. The SAR system of claim 1, wherein the ground-based station is configured to calculate the frequency and time of arrival of the reference signal to estimate the location of the reference beacon.

7. The SAR system of claim 1, wherein the reference beacon is mounted on a mobile vessel, and wherein the ground-based station is configured to track the location of the reference beacon.

8. The SAR system of claim 1, wherein the ground-based station further includes a calibration database for storing the system calibration factor.

9. The SAR system of claim 1, wherein the satellite is medium Earth orbit search and rescue (MEOSAR) satellite.

10. The SAR system of claim 1, wherein the ground-based station is configured to transmit the update message to the reference beacon via the satellite.

11. The SAR system of claim 1, wherein the update message comprises information enabling the reference beacon to a) program the reference beacon to transmit signal according to operational conditions, and b) reprogram the functionality of the reference beacon.

12. A reference beacon comprising:
an ultra-high frequency (UHF) antenna configured to transmit a reference signal to a ground-based station via a satellite, wherein the ground-based station is configured to:
calculate a system calibration factor based on a comparison of an estimate of a location of the reference beacon calculated based on at least one of a frequency and timing information associated with a reference signal received from the reference beacon and a known geographical location information captured by a global positioning system (GPS) of the reference beacon;
receive, via the satellite, a distress signal from a distress beacon which is different than the reference beacon;
calibrate the distress signal based on the calculated system calibration factor,
a reference signal generator having adjustable configuration settings, the reference signal generator configured to generate the reference signal according to the configuration settings;
a second antenna configured to receive the update message from the ground-based station, wherein the update message corresponds to the system calibration factor; and
a reference beacon controller configured to adjust the configuration settings of the reference signal generator based on the update message, wherein the update message comprises information enabling the reference beacon to establish a transmission pattern for the reference beacon.

13. The reference beacon of claim 12, wherein the UHF antenna transmits the reference signal according to a pseudo random transmission pattern.

14. The reference beacon of claim 12, further comprising a solar panel, charging/regulating circuitry, and a rechargeable battery.

15. The reference beacon of claim 12, further comprising a weather-proof housing in which the UHF antenna, reference signal generator, second antenna, and controller are at least partially disposed.

16. The reference beacon of claim 15, wherein the weather-proof housing is attached to a trackable mobile vehicle or vessel.

17. The reference beacon of claim 12, further comprising a global navigation satellite system (GNSS) receiver configured to receive location information, timing reference information, and clocking reference information.

18. A method of calibrating a search and rescue system, the method comprising the steps of:
calculating an estimate of a location of a reference beacon based on at least one of a frequency and a timing information associated with a received reference signal received from the reference beacon;
calculating a system calibration factor used for adjusting the estimate of the location of the reference beacon, based on the calculated estimate of the reference beacon and a known location information of the reference beacon captured by a global positioning system (GPS);
evaluating reference settings of the reference beacon in light of operational conditions of the reference beacon; and
sending an update message to the reference beacon to adjust the reference settings, wherein the update message comprises information enabling the reference beacon to adjust a transmission characteristic to minimize interference between the reference signal and the distress signal with respect to time and frequency;
receive, via the satellite, a distress signal from a distress beacon which is different than the reference beacon;
calibrate the distress signal based on the calculated system calibration factor.

19. The method of claim 18, further comprising the step of storing the system calibration factor in a calibration database.

20. The method of claim 18, further comprising the steps of:
calculating an estimate of the location of the distress beacon from the received distress signal; and
adjusting the estimate based on the system calibration factor.

21. The method of claim 18, further comprising the step of instructing the reference beacon to optimize a transmission of reference signal to allow a location information associated with the reference beacon to be accurately estimated and to minimize interference with distress signal from the distress beacon, the transmission of reference signal being optimized with respect to time, space, signal power, and signal structure.

* * * * *